United States Patent
Ishfaq et al.

(10) Patent No.: US 9,614,913 B2
(45) Date of Patent: Apr. 4, 2017

(54) PROVIDING TTY SERVICES IN A VEHICLE

(71) Applicant: General Motors LLC, Detroit, MI (US)

(72) Inventors: Mohammad Ishfaq, Northville, MI (US); Joshua M. Sine, Beverly Hills, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/302,131

(22) Filed: Jun. 11, 2014

(65) Prior Publication Data

US 2015/0365519 A1   Dec. 17, 2015

(51) Int. Cl.
*H04L 29/08* (2006.01)
*H04M 1/60* (2006.01)

(52) U.S. Cl.
CPC .......... *H04L 67/12* (2013.01); *H04M 1/6091* (2013.01)

(58) Field of Classification Search
CPC ....................................... H04B 1/38
USPC .................................................... 455/99, 557
See application file for complete search history.

(56) References Cited

U.S. PATENT DOCUMENTS

| 7,529,562 | B2* | 5/2009 | Van Bosch et al. .......... 455/557 |
| 2010/0054187 | A1* | 3/2010 | Hallenstal et al. ........... 370/328 |
| 2014/0194149 | A1* | 7/2014 | Lavi et al. .................... 455/458 |

* cited by examiner

*Primary Examiner* — Vladimir Magloire
*Assistant Examiner* — Majid Syed
(74) *Attorney, Agent, or Firm* — Christopher DeVries; James D. Stevens

(57) ABSTRACT

A method and a system for providing TTY services in a vehicle. The method may be carried out by the following steps: (a) providing a vehicle telematics unit configured to receive calls according to a first telecommunication standard and a second telecommunication standard, wherein the second telecommunication standard is newer than the first; (b) receiving an indication that a vehicle user desires to use a TTY device at the vehicle; (c) in response to step (b), switching to the first telecommunication standard until another indication is received indicating the user no longer desires to use the TTY device; and (d) sending or receiving a TTY message from the vehicle using the TTY device via the first telecommunications standard.

9 Claims, 3 Drawing Sheets

PROVIDING TTY SERVICES IN A VEHICLE

TECHNICAL FIELD

The present invention relates to wireless communication in a vehicle using a TTY device.

BACKGROUND

A teleprinter or teletypewriter (also known as a TTY device) is an electro-mechanical typewriter that can be used to send and receive typed messages from point to point. The TTY device may be coupled to or include a telephone connected to a land-line and enable the hearing-impaired to communicate where it otherwise would have been burdensome or impossible.

SUMMARY

According to an embodiment of the invention, there is provided a method and a system for providing TTY services in a vehicle. The method may be carried out by the following steps: (a) providing a vehicle telematics unit configured to receive calls according to a first telecommunication standard and a second telecommunication standard, wherein the second telecommunication standard is newer than the first; (b) receiving an indication that a vehicle user desires to use a TTY device at the vehicle; (c) in response to step (b), switching to the first telecommunication standard until another indication is received indicating the user no longer desires to use the TTY device; and (d) sending or receiving a TTY message from the vehicle using the TTY device via the first telecommunications standard.

According to another embodiment of the invention, there is provided a method and a system for providing TTY services in a vehicle. The method may be carried out by the following steps: (a) establishing communication between a TTY device in the vehicle and a vehicle telematics unit that comprises two cellular chipsets, a long term evolution (LTE) chipset and a circuit-switched chipset, wherein the establishing step includes an indication that the TTY device is enabled; (b) based on step (a), receiving or placing a voice call at the telematics unit using the circuit-switched chipset, wherein the voice call comprises Baudot tones generated by the TTY device; (c) receiving an indication that the TTY device is no longer enabled; and then (d) sending or receiving a data call using the LTE chipset of the telematics unit until step (a) is repeated.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to mobile or portable teletypewriter (TTY) devices used in vehicles having telematics equipment. Many telematics-equipped vehicles in use today are capable of establishing "voice calls" or "circuit-switched calls" (e.g., over Global System for Mobile or GSM, Code Division Multiple Access or CDMA, Universal Mobile Telecommunications System or UTMS, or other similar cellular standards). However, newer telematics devices in vehicles may utilize newer telecommunication standards, such as Long-Term Evolution or the LTE standard. Using LTE, circuited-switched calls are no longer placed or received; instead any voice communications occur over a "data call." With the advancement to LTE-capable vehicle telematics devices issues arise with legacy hardware—e.g., legacy TTY devices may be unable to interface or otherwise utilize the LTE standard. The present disclosure describes a communication architecture that enables a vehicle having an LTE-enabled telematics unit to fall back to a circuit-switched standard in order to receive or place calls using TTY. Further, when the TTY device is not present (or when the TTY device is present but not active), the same telematics unit may send and receive calls using the newer LTE standard.

Communications System—

Figure 1:
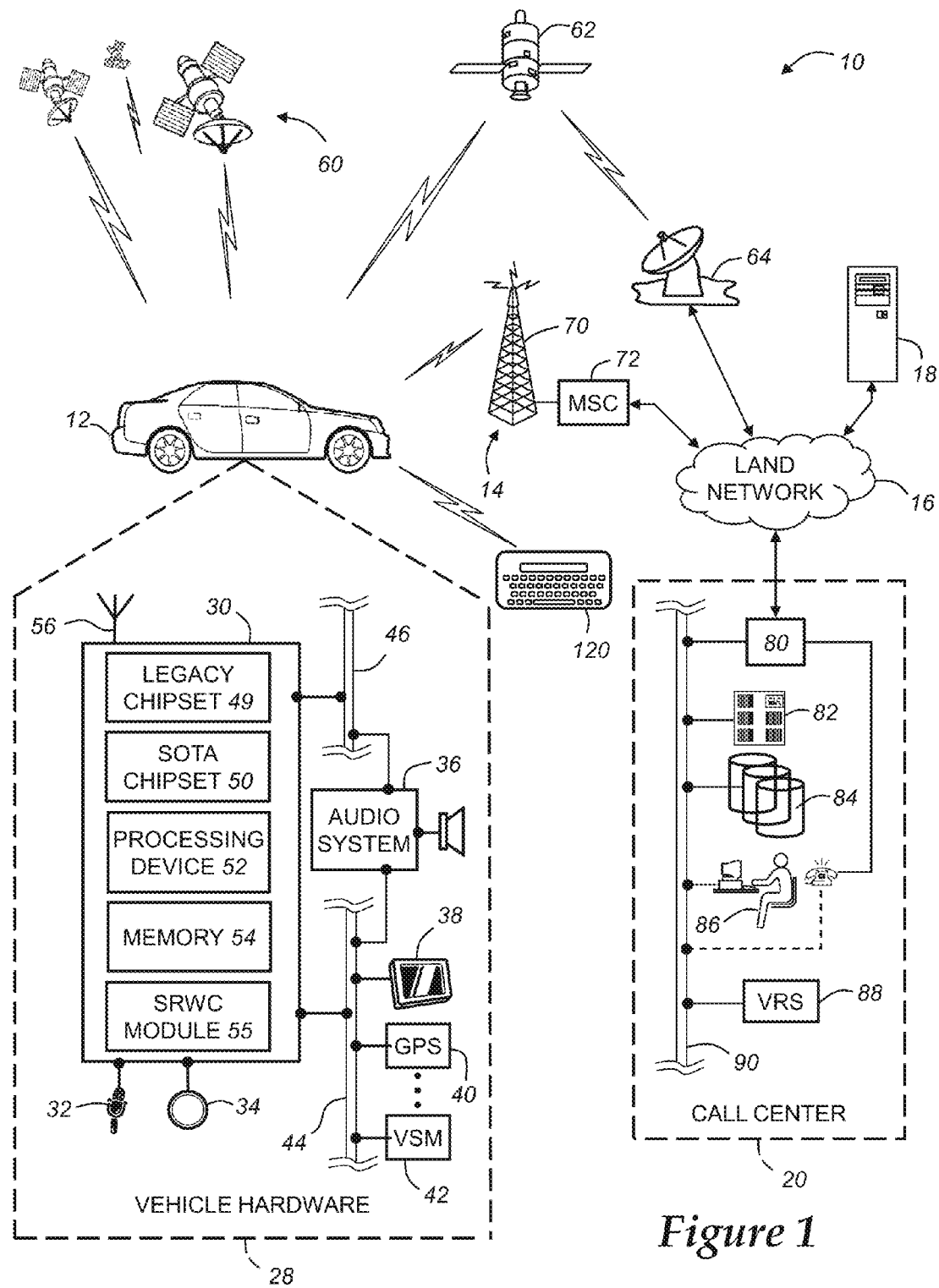
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication that includes an older standard or legacy cellular chipset 49 and a newer or state-of-the-art (SOTA) cellular chipset 50 (both capable of voice communications), a wireless modem for data transmission, one or more electronic processing devices 52, one or more digital memory devices 54, and a multi-function antenna 56. It will be appreciated that the legacy chipset 49 may utilize GSM, CDMA, CDMA2000, UTMS, or other suitable circuit-switched standards, and the newer chipset 50 may utilize an LTE or other suitable packet-data standard. The examples of circuit-switched and packet-data standards are merely exemplary implementations and other standards are also possible. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 120) can also be carried out using telematics unit 30. For this purpose, telematics unit 30 may further comprise a short-range wireless communication (SRWC) module 55 which can be configured to communicate wirelessly according to one or more suitable wireless protocols (e.g., WiMAX, ZigBee™, etc.), including any other short range wireless communication (SRWC) such as any suitable Wi-Fi standard (e.g., IEEE 802.11), Wi-Fi Direct or other suitable peer-to-peer standard, Bluetooth, wireless infrared transmission, or various combinations thereof. Thus, SRWC should be construed broadly to include all short-range wireless protocols such as WiMAX, ZigBee™, Wi-Fi, Wi-Fi Direct, Bluetooth, etc. When used for packet-switched data communication such as TCP/IP, the telematics unit can be configured with a static IP address or can set up to automatically receive an assigned IP address from another device on the network such as a router or from a network address server.

Processor(s) 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

For example, the vehicle electronics 28 may also include a communication device such as a vehicle head unit or vehicle multi-tainment unit (VMU) 100 which may be configured to provide vehicle entertainment services, vehicle infotainment services, and a wide variety of other suitable services to vehicle users and/or occupants. The VMU 100 may include or be coupled to some of the vehicle electronics previously discussed (e.g., the audio system, the visual display, etc.). Display examples of the VMU include an interactive user interface 101 (e.g., having switches or keys) in the vehicle instrument panel, interactive displays embedded within the backing of vehicle seating or the vehicle headliner, and other interactive vehicle devices/displays that are portable. The VMU may have an physical and/or interactive user interface—e.g., to enable adjustment of controls, settings, etc.

Figure 2:
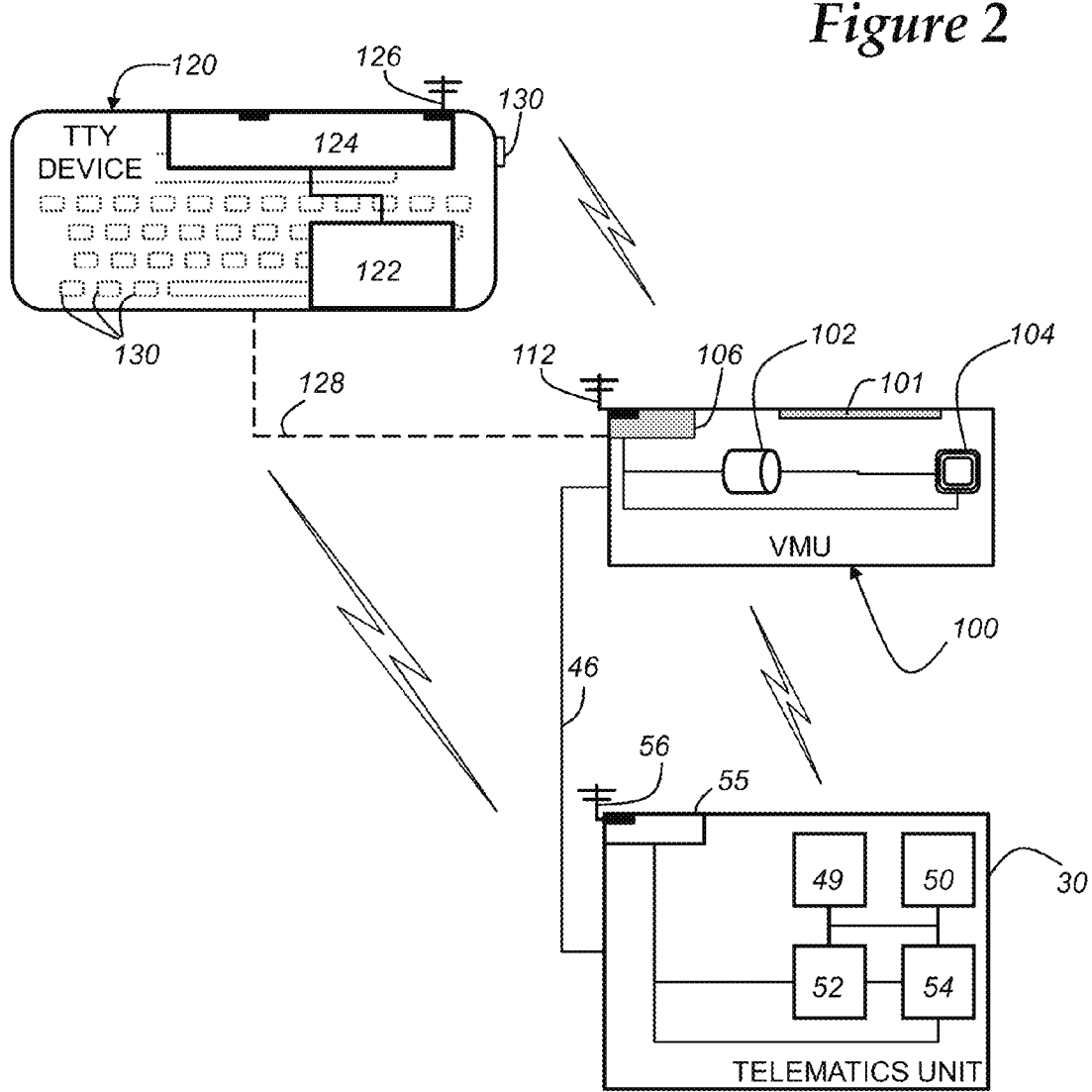
FIG. 2 is a schematic diagram of a portion of the communications system shown in FIG. 1.

As shown in FIG. 2, the VMU 100 may include any electronics, software, etc. suitable to enable the services discussed above. The VMU may comprise memory 102, a processing device 104, and a SRWC module 106—all electronically coupled to one another and/or in communication with one another. The module 106 may be configured similarly as the module 55 (in the telematics unit 30) enabling wireless communication between the VMU and the telematics unit 30 (or a mobile device 120) via an antenna 112. The VMU 100 may be coupled to the telematics unit 30 by wire as well (e.g., via bus 46). The illustrated VMU 100 is merely one example. Other implementations exist; also, embodiments exist where the VMU is absent.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

As shown in FIGS. 1 and 2, the operating environment may further include one or more handheld communications devices (HCDs) or mobile devices 120. The mobile device may be an electronic device capable of providing telephonic messages for transmission over a wide geographic area—e.g., using the wireless carrier system 14.

In at least one implementation, the mobile device 120 may be a TTY device as shown in FIGS. 1 and 2. The TTY device may comprise a processing unit 122 having one or more processors and memory, a SRWC module 124, and antenna 126 electronically coupled to one another and configured to receive a user input via one or more switches or key 130 and provide as output a TTY message. Furthermore, the TTY message may be wirelessly transmittable using the module 124 via antenna 126. The module 124 may be configured similarly as the modules 55, 106 enabling SRWC communication between all three devices. The components and configuration of TTY devices are known, as well as the techniques for using such devices.

In one embodiment, the TTY device 120 tethered or coupled by wire 128 to the vehicle; e.g., in FIG. 2, the TTY device is shown coupled to the VMU 100. This may be in addition to or in lieu of the SRWC module 124.

Any suitable mobile device 120 and vehicle 12 may be used together by a person known as the vehicle user such as a vehicle driver or a vehicle passenger. However, the vehicle user does not need to have ownership of the mobile device 120 or the vehicle 12 (e.g., the vehicle user may be an owner or a licensee of either or both).

Method—

Some vehicle users may desire to utilize the mobile device 120 (e.g., a TTY device as previously described) to place or receive phone calls in the vehicle 12; more specifically, to send TTY messages to another telephonic device. In many newer vehicles, the vehicle 12 may be equipped with only a packet-data chipset, such as chipset 50. It should be appreciated that conventional TTY devices transmit and receive TTY messages using Baudot tones—and that Baudot tone calls cannot be placed over data calls, i.e., calls using a packet-data standard such as LTE. Therefore, the illustrative method below presents a means for enabling TTY service in a vehicle having an LTE-equipped telematics unit. Moreover, the present method(s) maintain the ability to place non-TTY calls using LTE service when desired.

Figure 3:
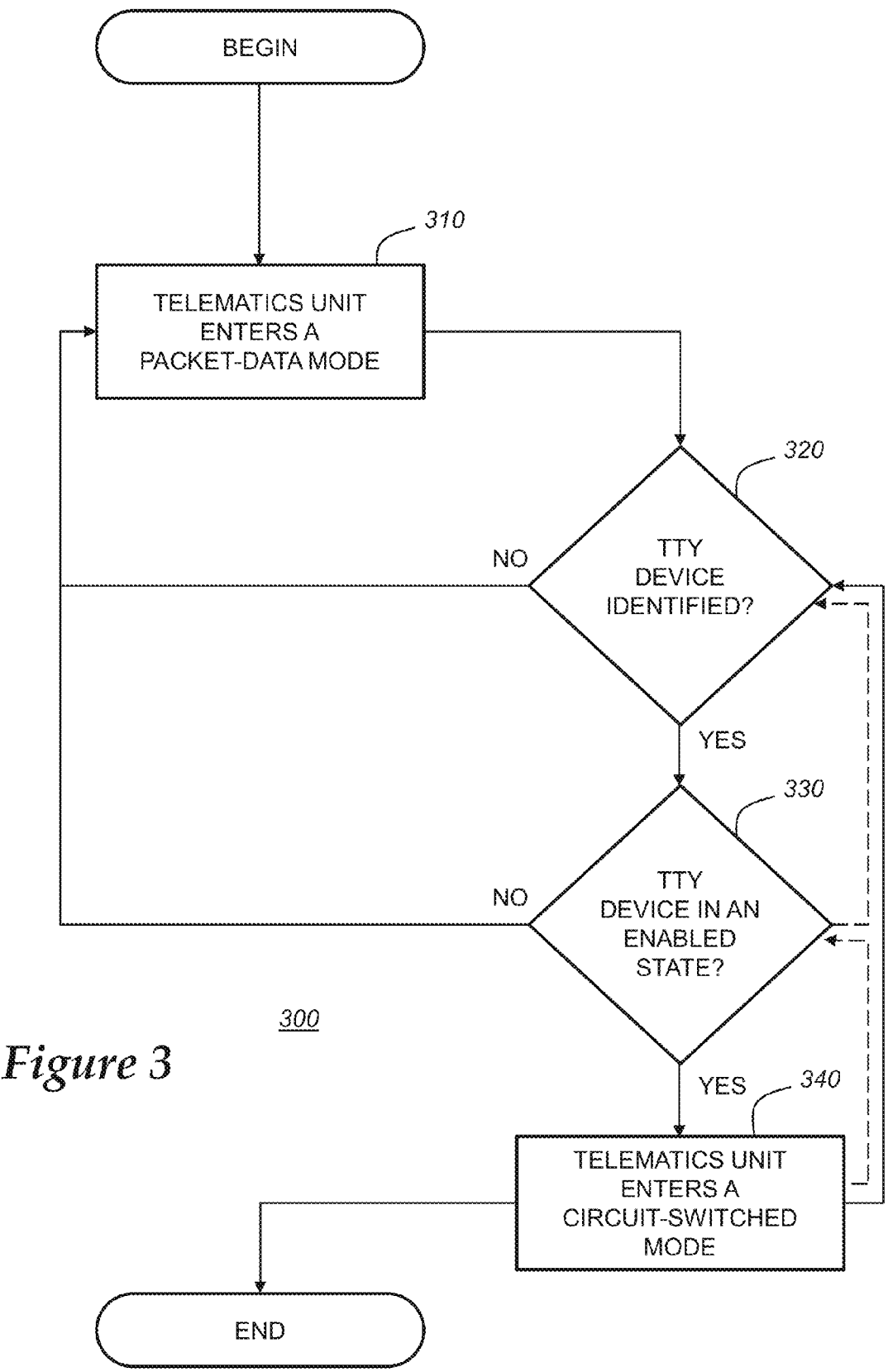
FIG. 3 is a flow diagram illustrating one embodiment of a method of utilizing the system shown in FIGS. 1 and 2.

Turning now to FIG. 3, there is shown a flow diagram illustrating one embodiment of a method 300 of using the previously described mobile communications system 10 that provides TTY services in the vehicle 12.

Beginning at step 310, the method places or sets the telematics unit 30 in a SOTA or packet-data mode—e.g., in an LTE mode; i.e., at least enabling the telematics unit to use a newer telecommunication standard such as LTE. In the LTE mode, the telematics unit 30 may merely stand-by or send and/or receive one or more calls via a wireless connection to an LTE network. In the packet-data mode, only data calls may be sent and/or received using the SOTA chipset 50; i.e., no circuit-switched calls are possible regardless of whether voice communications occur during the data call. In at least one embodiment, the LTE mode is the telematics unit's default mode. Following step 310, the method proceeds to step 320.

In step 320, the method 300 determines or identifies whether the TTY device 120 is present in or near the vehicle 12. For example, the telematics unit 30 and/or the VMU 100 may make this determination. The identification may include identifying an indication of a wired or wireless coupling of the TTY device 120. Wired couplings may be identified in a variety of known ways, including a change in an electrical parameter such as current or voltage. Wireless couplings may include SRWC signals indicating a discoverable mode or a desire (or request) to wirelessly pair, just to name a couple of examples. Indications may vary depending upon the SRWC protocol. Discoverable modes, pairing requests and procedures, etc. are known to skilled artisans and will not be discussed further here.

In addition, it should be appreciated that any coupling of the VMU 100 and TTY device 120 may be secure. For example, various encryption techniques may be employed to enhance communication security. In some instances, the devices may be previously paired/discovered; in these and other instances, any suitable notification between the devices that the other device is present may be considered identification.

While step 320 was illustrated according to an identification by the VMU 100, it should be appreciated that alternative embodiments exist as well where the telematics unit 30 identifies the presence of the TTY device 120.

Where step 320 fails to identify the TTY device 120, the method may repeat step 310—i.e., the telematics unit 30 may remain in the packet-data mode. But where step 320 successfully identifies the TTY device 120, the method 300 then proceeds to step 330.

In step 330, the method determines whether the TTY device 120 is in an enabled or active state. The enabled state may be prompted by any indication from the TTY device 120 indicating a desire to transmit a TTY message or stand-by and/or receive a TTY message. Thus, this indication may be prompted by user input (e.g., via actuation of one or more switches 130 on the device or via the VMU user interface 101). In another embodiment, the mere coupling (as in step 320) of the TTY device may be the indication that the TTY device 120 is in the enabled state. Thus, in such instances, decoupling the device 120 automatically may change the TTY device to disabled or inactive state. In other instances, disabling the device 120 may require additional user input.

It should be appreciated that it may be desirable for the vehicle user to bring the TTY device 120 near or into the vehicle 12 but not automatically enable the TTY device. For example, the vehicle user may desire to be in the LTE mode to receive data or other information having better quality of service (QoS) parameters than that available using a circuit-switched connection. Or for example, another vehicle user may desire to utilize the LTE network while the TTY device 120 is in the vehicle.

If in step 330, the method determines that the TTY device is in the disabled state, the method may proceed to step 310 and repeat steps 310, 320, and 330 as described above. Alternatively, the method may proceed to step 320—repeating only that step.

However where in step 330 the method determines that the TTY device is in an enabled state, the method proceeds to step 340. In step 340, the telematics unit 30 enters or switches or falls back to a legacy mode; i.e., at least temporarily, the telematics unit 30 uses the legacy chipset 49. An example of the legacy mode used in method 300 includes a circuit-switched mode (however, as explained below other modes are possible). In the circuit-switched mode, the telematics unit may either stand-by (e.g., ready to receive or place a circuit-switched call) or receive and/or place circuit-switched calls—e.g., regardless of whether the user(s) place or receive calls using the TTY device 120.

Thus, step 330 may include making voice calls in the circuit-switched mode. For example, the user may prepare a TTY message using the TTY device 120. When the TTY message is prepared (e.g., a series of Baudot tones), the message may be wirelessly transmitted between the device 120 and the VMU 100 (or the telematics unit 30) via a SRWC link (e.g., Bluetooth or Wi-Fi Direct). The VMU 100 may receive the TTY message and provide it via the bus 46 to the telematics unit 30 (or alternatively via another SRWC link). The telematics unit 30 may prepare and configure the TTY message for cellular transmission using the legacy chipset 49 and then transmit the configured TTY message using one or more wireless carrier systems 14.

Similarly, voice calls comprising a series of Baudot tones may be received by the chipset 49 and ultimately provided from the telematics unit 30 to the TTY device 120.

Where it is desirable to transmit data to or from the telematics unit 30, the data may be transmitted using a voice call—e.g., using a vocoder; skilled artisans will appreciate the configurations and techniques of data transmissions over voice calls, as well as other suitable techniques including VoIP.

The flow diagram in FIG. 3 illustrates that following step 340 the method may either end or may continuously re-determine steps 320 and/or 330 (i.e., that the TTY device 120 is still identified and/or still in the enabled state). In the event the TTY device 120 is no longer identified (step 320) or no longer in the enabled state (step 330), the telematics unit 30 may revert then to the default mode—e.g. using the LTE chipset 50.

Other embodiments exist as well. For example, instead of using the circuit-switched mode in method 300, the method may use an internet protocol (IP) multimedia system (IMS/IP) connection mode which may also be performed using a suitable circuit-switched telecommunications standard (e.g., CDMA). Thus, the telematics unit 30 may utilize the legacy chipset 49 to wirelessly communicate in the IMS/IP connection mode provided the TTY device remains identified (see step 320) and in the enabled state (see step 330).

Thus, there has been described method(s) of using a TTY device in a vehicle that is equipped with a telematics unit capable of transmission using a newer telecommunication standard (e.g. such as LTE). The method(s) enable the user to communicate with TTY devices that are incompatible with the newer standard by switching or falling back (temporarily) to a legacy telecommunication standard (e.g., such as CDMA). Moreover, once it is determined that use of the TTY device is not currently desired, the method reverts to the newer telecommunication standard.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing TTY services in a vehicle, comprising the steps of:

establishing a cellular link between a vehicle telematics unit and a wireless carrier system, wherein the telematics unit is configured for cellular communication according to a first telecommunication standard using a first chipset and according to a second telecommunication standard using a second chipset;

identifying at the telematics unit a TTY device near or within the vehicle;

receiving at the telematics unit an indication that the TTY device is in an enabled state, wherein the enabled state indicates that a vehicle user desires to use the TTY device;

in response to receiving the indication, switching at the telematics unit from communicating with the wireless carrier system via the second telecommunications standard to communicating with the wireless carrier system via the first telecommunications standard; and transmitting a TTY message from the telematics unit via the first telecommunications standard.

2. The method of claim 1, wherein the first telecommunication standard is a circuit-switched standard and the second telecommunication standard is a long-term evolution (LTE) standard.

3. The method of claim 2, wherein the circuit-switched standards include: Global System for Mobile or GSM (GSM), Code Division Multiple Access (CDMA), CDMA2000, and Universal Mobile Telecommunications System (UTMS).

4. The method of claim 1, wherein the second telecommunication standard is the default telecommunication standard when the another indication is received indicating the user no longer desires to use the TTY device.

5. The method of claim 4, further comprising:
receiving an indication that the TTY device is no longer identified, no longer in the enabled state, or both; and then
reverting to the second telecommunication standard until another indication is received that indicates that the vehicle user desires to use the TTY device at the vehicle.

6. The method of claim 1, wherein the TTY device communicates with the telematics unit or a vehicle multi-tainment unit (VMU) via one of a wired coupling or a wireless coupling, wherein the wireless coupling is a short range wireless communication (SRWC) link.

7. A method of providing TTY services in a vehicle, comprising the steps of:
establishing a cellular link between a vehicle telematics unit and a wireless carrier system, wherein the telematics unit is configured for cellular communication according to a circuit-switched telecommunication standard and a second telecommunication standard, wherein the cellular link is according to the second telecommunication standard;
establishing communication between the telematics unit and a TTY device in the vehicle, wherein the telematics unit is configured to send and receive TTY messages received from the TTY device:
according to the circuit-switched telecommunication standard, and
according to the second telecommunication standard via an internet protocol multi-media subsystem (IMS/IP) architecture;
receiving at the telematics unit an indication of an enabled state of the TTY device, wherein the enabled state indicates that a vehicle user desires to use the TTY device; and
in response to receiving the indication, determining whether to transmit a TTY message from the TTY device according to the circuit-switched telecommunication standard or according to the second telecommunication standard,
wherein, when it is determined to transmit the TTY message via the circuit-switched telecommunication standard, then switching at the telematics unit from communicating via the second telecommunications standard to communicating via the circuit-switched telecommunications standard and transmitting the TTY message from the telematics unit via the circuit-switched telecommunications standard, and
wherein, when it is determined to transmit the TTY message via the second telecommunication standard, then transmitting from the telematics unit the TTY message via the second telecommunications standard via the IMS/IP architecture.

8. The method of claim 7, wherein establishing communication between the telematics unit and the TTY device includes establishing a short range wireless communication (SRWC) link between the TTY device and one of the telematics unit or a vehicle multi-tainment unit (VMU), wherein the VMU is coupled to the telematics unit.

9. A method of providing TTY services in a vehicle, comprising the steps of:
establishing a cellular link between a vehicle telematics unit and a wireless carrier system, wherein the cellular link enables packet-data communication;
establishing a communication link between a TTY device in the vehicle and the telematics unit;
receiving an indication at the telematics unit via the communication link that the TTY device is in an enabled state, wherein the enabled state indicates that a vehicle user desires to use the TTY device;
via the communication link, receiving at the telematics unit a TTY message from the TTY device; and
in response to receiving the TTY message, transmitting from the telematics unit a packet-data call that includes the TTY message, wherein the packet-data call utilizes an internet protocol multi-media subsystem (IMS/IP) architecture.

* * * * *